US008712885B2

(12) United States Patent  
Naccache (10) Patent No.: US 8,712,885 B2
(45) Date of Patent: Apr. 29, 2014

(54) METHOD FOR ASSISTING IN THE CHECKING OF TRANSACTION RECORDS, TRANSACTION DEVICE, SERVER, MOBILE TERMINAL, AND CORRESPONDING COMPUTER PROGRAMS

(75) Inventor: David Naccache, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 20 days.

(21) Appl. No.: 12/643,325

(22) Filed: Dec. 21, 2009

(65) Prior Publication Data

US 2010/0185535 A1 Jul. 22, 2010

(30) Foreign Application Priority Data

Dec. 22, 2008 (FR) ...................... 08 58966

(51) Int. Cl.
  G07B 17/00 (2006.01)
  G06F 17/22 (2006.01)
  G07F 19/00 (2006.01)
  G06Q 40/00 (2012.01)
(52) U.S. Cl.
  USPC ................... 705/34; 705/30; 705/31; 705/39; 705/40; 705/35
(58) Field of Classification Search
  USPC ............................. 705/34, 30, 31, 35, 39, 40
  See application file for complete search history.

(56) References Cited

U.S. PATENT DOCUMENTS

| 6,226,624 | B1 * | 5/2001 | Watson et al. | 705/44 |
|---|---|---|---|---|
| 7,124,937 | B2 * | 10/2006 | Myers et al. | 235/380 |
| 7,861,922 | B2 * | 1/2011 | Lee et al. | 235/379 |
| 7,870,077 | B2 * | 1/2011 | Woo et al. | 705/78 |
| 2004/0019564 | A1 * | 1/2004 | Goldthwaite et al. | 705/44 |
| 2004/0122685 | A1 | 6/2004 | Bunce | |
| 2006/0180660 | A1 * | 8/2006 | Gray | 235/380 |
| 2007/0084913 | A1 | 4/2007 | Weston | |
| 2008/0010190 | A1 * | 1/2008 | Rackley, III et al. | 705/39 |
| 2009/0055314 | A1 * | 2/2009 | Myers et al. | 705/39 |
| 2009/0319402 | A1 * | 12/2009 | Manista et al. | 705/30 |

OTHER PUBLICATIONS

Definition of "neighbor" retrieved from dictionary.com, with reference to Collins English Dictionary, published by Harpur Collins in 1998.*
Kao, Robert & Sarigumba, Dante (Oct. 22, 2007). Blackberry for Dummies®. John Wiley & Sons.*
The Examiner defines "transaction" as "something transacted; especially : an exchange or transfer of goods, services, or funds". See Merriam-Webster Dictionary (2012).*
French Search Report dated Sep. 15, 2009 for corresponding French Application No. 0858966, filed Dec. 22, 2008.

\* cited by examiner

*Primary Examiner* — Seye Iwarere
*Assistant Examiner* — Peter L Ludwig
(74) *Attorney, Agent, or Firm* — David D. Brush; Westman, Champlin & Koehler, P.A.

(57) ABSTRACT

A method and apparatus are provided for assisting in checking accuracy of bank transaction records edited in a bank statement and performed by at least one transaction device. The method includes, for at least one of the transactions: emission, by the transaction device, of at least one first signal including a message relating to the transaction; receipt, by at least one mobile terminal, of the at least one first signal; transmission, by the mobile terminal, of a second signal including at least the message, to at least one banking organization; association, by a server of the banking organization in charge of the transaction, of the message with at least one datum relating to the transaction, and marking of the transaction as a pre-checked transaction.

7 Claims, 4 Drawing Sheets

METHOD FOR ASSISTING IN THE CHECKING OF TRANSACTION RECORDS, TRANSACTION DEVICE, SERVER, MOBILE TERMINAL, AND CORRESPONDING COMPUTER PROGRAMS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of transactions performed by means of a transaction device, for example an electronic payment terminal or an automatic cash dispenser.

More specifically, the disclosure relates to the production of bank statements representing these transactions, and more specifically the implementation of means for assisting in the checking of the accuracy of data appearing on said statements.

BACKGROUND OF THE DISCLOSURE

Certain organizations, such as banking organizations, for example, or large stores managing client accounts, can provide their clients with different statements, and in particular electronic statements or paper statements.

In general, a bank statement has a certain amount of information relating to the transactions performed by the client, commonly presented in the form of lines, each representing a specific transaction.

A disadvantage of this technique of the prior art is that the statements may contain a very large amount of information, which is difficult for the client to check when he or she wants to verify the accuracy thereof. Thus, for a statement classically presenting all of the transactions performed during a month, the client may spend a significant amount of time checking the content thereof.

SUMMARY

An aspect of the disclosure relates to a method for assisting in the checking of the accuracy of bank transaction records edited in a bank statement and performed by means of at least one transaction device.

According to an aspect of the disclosure, such a method includes, for at least one of said transactions, the following steps:
  emission, by said transaction device, of at least one first signal including a message relating to said transaction;
  receipt, by at least one mobile terminal, of said at least one first signal;
  transmission, by said mobile terminal, of a second signal including at least said message, to at least one banking organization;
  association, by a server of the banking organization in charge of the transaction, of said message with at least one datum relating to said transaction, and marking of said transaction as a pre-checked transaction.

Thus, an aspect of the disclosure is based on a novel and inventive approach to the assistance in the checking of bank statements, which uses the proximity of a mobile terminal of the user involved in a transaction in order to be capable of marking said transaction as a trusted, or pre-checked, transaction. This marking then enables, at the level of the banking organization in charge of managing transactions, to process pre-checked transactions and non-pre-checked transactions differently, so as to indicate them differently in a bank statement.

According to an illustrative embodiment of the disclosure, a communication is implemented between a transaction device, for example an electronic payment terminal or an automatic cash dispenser, and a mobile terminal, for example a mobile telephone or a "PDA" ("Personal Digital Assistant") carried by the user involved in the transaction.

Then, the mobile terminal transmits the information received from the transaction device to the banking organization(s) with which it is "paired" in order to implement the an aspect of the disclosure.

For example, an application, pre-installed on the mobile telephone of a user, enables a message carried by a signal received from a transaction device to be transferred to the banking organization in charge of management of the bank account of the user carrying the mobile telephone.

The checking assistance method according to an aspect of the disclosure therefore includes a processing of the transaction parallel to the classic processing of the recording of the transaction, independent of the latter and optional.

According to a specific feature of the disclosure, the checking assistance method includes a step of generating a bank statement by a server of said banking organization, implementing a different processing for the transactions marked as pre-checked and for the unmarked transactions.

Thus, the marking of transactions as pre-checked enables the server of the banking organization in charge of these transactions to process them differently from the non-pre-checked transactions, so as to be capable of also indicating them as different on a bank statement.

The checking of a bank statement by a user, in order to verify the accuracy thereof, is thus facilitated by a specific marking of the transactions that have been pre-checked by the method according to an aspect of the disclosure. The user can thus save time by verifying only the transactions appearing as non-pre-checked on his/her bank statement.

Classically, a transaction corresponds to one line of a statement, and includes in particular information concerning the amount of the transaction, the date of the transaction and a transaction description.

For example, the bank statement according to an exemplary aspect of the disclosure can be divided into two distinct portions, the first showing the pre-checked transactions and the second showing the non-pre-checked transactions. Thus, in the case of an electronic bank statement, the user can, for example, choose not to display the first portion of the statement, and in the case of a paper statement, the user can, for example, ask the banking organization not to print this first portion of the statement.

The bank statement can also group together the pre-checked transactions at the end of the statement, so that the user can easily identify them in his/her inspection of the statement.

In another example, the bank statement can have elements marking these pre-checked transactions, for example a different text color, a different character font, the use of italics or bold characters, an additional column showing a pre-checking indicator, and so on.

According to an exemplary aspect of the disclosure, said message relating to said transaction includes coded information relating to said transaction and/or to an electronic card used for said transaction.

In this way, the message relating to the transaction can be decoded and associated with the transaction in question, and with the electronic card involved in the transaction. This information is indeed necessary in order to recognize, for example, the carrier of the card and therefore his/her bank account, so as to be capable of then using the transaction marking information.

For example, this information enables the banking organization having received the message to know to which client it refers.

In particular, said first signal is transmitted according a communication technique belonging to the group including:
  "Bluetooth" technology;
  "Wi-Fi" technology;
  "RFID" technology;
  "NFC" ("Near Field Communication") technology;
  infrared technology.

Thus, according to various exemplary aspects of the disclosure, the communication between the transaction device and the mobile terminal is implemented via different technologies, varying for example according to the type of mobile terminal involved.

According to a specific feature of the disclosure, said first signal is emitted to all of the mobile terminals in the vicinity of said transaction device.

Thus, when a transaction is performed by a client, the transaction device involved generates a first signal and broadcasts it to all of the mobile terminals in the vicinity thereof.

According to this embodiment, the transaction device does not address its signal to one mobile terminal in particular, but broadcasts it so that all of the neighboring mobile terminals can receive it. This embodiment enables the transaction device to generate its signal without worrying about the recipient(s).

For example, if the transaction device communicates via "Bluetooth" technology, all of the portable telephones and pocket computers located at a distance enabling such a signal to be received will receive this first signal from the transaction device.

According to the various embodiments described below, this signal received by all of the mobile terminals in the vicinity of the transaction device is processed differently.

According to one aspect of the disclosure, said step of transmitting a second signal, to at least one banking organization, is implemented by each of said mobile terminals having received said first signal.

Thus, the mobile terminals having received a signal from the transaction device transfer the message carried by said signal to the banking organization(s) with which they are "paired".

This aspect of the disclosure does not require the message to be processed by the mobile terminals having received it. Thus, the mobile terminals systematically transfer the message, without knowing the content thereof and without knowing whether the transaction actually concerns the banking organization to which they are transferring the message.

The processing of the message is performed subsequently by the banking organizations having received the message.

Thus, each banking organization having received a message from a mobile terminal decodes it so as to extract the information relating to the transaction and to the electronic card involved in said transaction. In this way, the bank account associated with the card can be identified, and the banking organization can know whether or not it is in charge of the management of said account.

If this is the case, the banking organization, via a server, implements the step of associating the message with at least one datum relating to the transaction, and the marking of the transaction as a pre-checked transaction; otherwise, the banking organization stops the processing of the message.

According to a specific aspect of the disclosure, the checking assistance method includes, for each of the mobile terminals having received said first signal, a step of validation of said message relating to said transaction, and said step of transmitting a second signal, to at least one banking organization, is implemented only by a mobile terminal having validated said message.

Thus, according to this embodiment, each mobile terminal having received a signal from the transaction device verifies whether the message received concerns it, i.e. whether the transaction was performed via an electronic card belonging to the carrier of the mobile terminal. If this is the case, the mobile terminal transfers the message to the banking organization concerned; otherwise, the message is ignored by the mobile terminal.

Again, the information contained in the message enables the application in the mobile telephone to identify the electronic card involved in the transaction, and to recognize whether this card is associated with the carrier of the mobile telephone.

In this way, the message carried by the signal transmitted by the transaction device is not systematically transferred to all of the banking organizations associated with all of the telephones having received the signal, but only to the banking organization in charge of the transaction.

According to an exemplary aspect of the disclosure, the checking assistance method includes a preliminary step of emission, by a mobile terminal associated with an electronic card used for said transaction, of at least one identification information, to said transaction device, and said first signal is transmitted only to said mobile terminal.

Thus, according to this embodiment, the transaction device does not broadcast a signal to all of the neighboring mobile terminals, but transmits the signal only to a mobile telephone, previously identified, concerned by the transaction.

For example, the mobile terminal associated with the electronic card involved in the transaction emits, to the transaction device, a signal carrying information for identification of the electronic card(s) with which it is associated. Then, when one of these cards is involved in a transaction, the transaction device knows the mobile terminal to which it must emit its first signal carrying the message relating to the transaction.

The disclosure also relates to a transaction device capable of performing a banking transaction, including means for emitting a signal including a message relating to said transaction to at least one neighboring mobile terminal.

According to an exemplary aspect of the disclosure, the device includes means for receiving at least one identification information from at least one neighboring mobile terminal.

Such a device is in particular capable of implementing the steps of the checking assistance method described above, and is, for example, an electronic payment terminal or an automatic cash dispenser.

Another aspect of the disclosure relates to a bank server, including:
- means for receiving a signal including at least one message relating to a transaction;
- means for processing said message;
- means for associating said message with at least one datum relating to a transaction, and means for marking said transaction as a pre-controlled transaction;
- means for generating at least one bank statement implementing a different processing operation for the transactions marked as pre-checked and for unmarked transactions;

The disclosure also relates to a mobile terminal including:
- means for receiving at least one first signal including a message relating to a transaction, transmitted by a transaction device processing said transaction;
- means for transmitting a second signal including at least said message to at least one banking organization;

so as to enable the association, by a server of the banking organization in charge of the transaction, of said message with at least one datum relating to said transaction, and marking of said transaction as a pre-checked transaction.

Such a terminal according to an exemplary aspect of the disclosure includes means for validating a message relating to a transaction carried by said signal, wherein said validation means are implemented prior to said means for transmitting a second signal including at least said message to at least one banking organization.

The disclosure also relates to a computer program downloadable from a communications network and/or recorded on a computer-readable medium and/or capable of being run by a processor, including program code instructions for implementation of the checking assistance method as described above, when it is executed on a transaction device.

The disclosure also relates to a computer program downloadable from a communications network and/or recorded on a computer-readable medium and/or capable of being run by a processor, including program code instructions for implementation of the checking assistance method as described above, when it is executed on a mobile terminal.

Another aspect of the disclosure relates to a computer program downloadable from a communications network and/or recorded on a computer-readable medium and/or capable of being run by a processor, including program code instructions for implementation of the checking assistance method as described above, when it is executed on a bank server.

Finally, the disclosure relates to a signal representing a statement transmitted by a bank server, including at least one indicator enabling the transactions marked as pre-checked to be distinguished according to the checking assistance method described above and the unmarked transactions.

BRIEF DESCRIPTION OF THE DRAWINGS

Other features and advantages will become clearer in view of the following description of a specific embodiment, provided as a simple illustrative and non-limiting example, and appended drawings, in which.

DETAILED DESCRIPTION OF ILLUSTRATIVE EMBODIMENTS

1. General Principle of an Exemplary Aspect of the Disclosure

The general principle of an exemplary aspect of the disclosure is based on the use of a mobile terminal of the client in order to transmit a message, for example a receipt, relating to a transaction, emitted by the transaction device (electronic payment terminal or automatic cash dispenser) performing the transaction, to the banking organization of the client.

This receipt then enables the banking organization to mark the transaction as a trust, or a pre-checked, transaction, and to perform a classification of the transactions of the client, depending on whether they are marked as pre-checked or not.

This classification then enables a different presentation of these transactions marked as pre-checked on a bank statement, so as to make it easier for the client to check his/her statement.

When a bank statement is produced by a server of a banking organization, a plurality of presentation options can be chosen in order to distinguish the transactions marked as pre-checked from those that are unmarked.

For example, the transactions marked as pre-checked can be grouped together at the end of the bank statement, or in an appendix to said statement. Thus, the user checking the accuracy of the data of the statement can save time by not verifying the transactions marked as pre-checked.

In another example, the transactions marked as pre-checked can appear in a different color from that of the unmarked transactions, so as to emphasize them in the statement. The use of a different font or italics or bold characters can also be chosen in order to distinguish the transactions marked as pre-checked from the unmarked transactions.

Figure 1A:
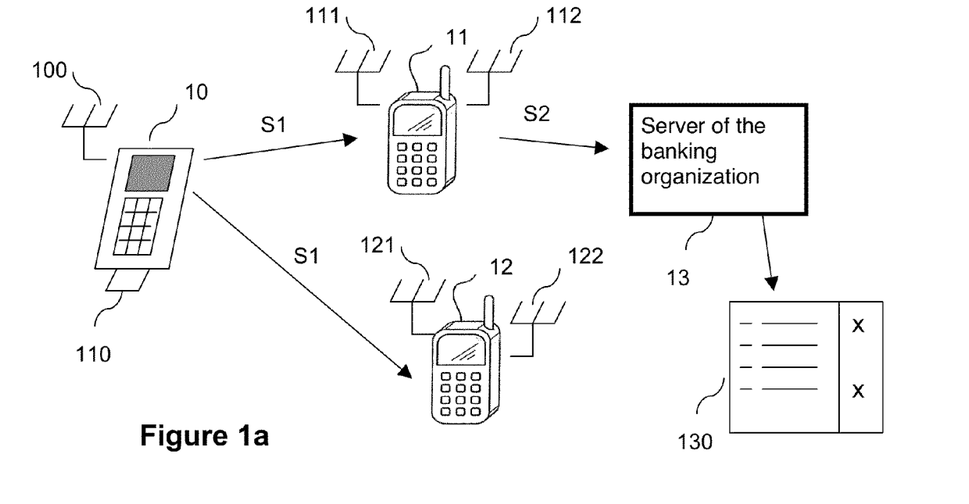
FIGS. 1a, 1b and 1c show examples of a system for implementing the checking assistance method according to exemplary embodiments of the disclosure.

The transactions marked as pre-checked can also be identified by an indicator (a cross, for example) in an additional column added to each line of the statement, as shown for a statement 130 in FIG. 1a.

The user can thus quickly identify the transactions having been pre-checked, among all of the transactions indicated in the statement.

2. Description of a First Embodiment

An example is provided, in reference to FIG. 1a, of a system for implementing an aspect of the disclosure according to a first embodiment.

A transaction device 10 is considered, for example an electronic payment terminal, in which a first user U1 has inserted an electronic card 110, in order to perform a transaction T.

This user U1 is the carrier of a mobile terminal 11, for example a mobile telephone, including one or more antennas 111, 112 for transmission.

In addition, the bank account of said user U1, and in particular the transactions carried out via the electronic card 110, is managed by a banking organization, which has a server 13 storing the information relating to the transactions, and capable of generating (alone or in cooperation with another dedicated server) statements 130.

At the time of the transaction T, a second user U2, carrying a mobile terminal 12, including one or more antennas 121, 122, for reception and/or transmission, can also be located near the transaction device 10 (for example, in a line at a store check-out, or in front of an automatic cash dispenser).

In reference to FIG. 2a, the main steps of the checking assistance method will now be described according to a first embodiment, implemented in a system as described above in reference to FIG. 1a.

At the time of the transaction T, or subsequently (for example, according to the use of the transaction device, or the communication traffic), the transaction device 10 emits, via an antenna 100, in a step 20, a first signal S1, including a message relating to the transaction T. For example, this message can correspond to a receipt, including information relating to the transaction T such as the amount and the date, as well as information relating to the electronic card 110, such as a bank account number or another bank identifier, an identifier of the card carrier U1, and so on.

This information can be transmitted in coded form in the message carried by the signal S1. This assumes that a preliminary exchange of keys has taken place (in order to decipher this information), between the transaction terminal and the banking organization 13, or between the transaction terminal and the mobile terminal, in a classic manner, which will not be described in greater detail here.

This signal can be transmitted via various communications technologies, such as, for example, "Bluetooth", "Wi-Fi", "RFID", "NFC" ("Near Field Communication"), or infrared technology.

In the example of FIG. 1a, this signal S1 is broadcast via Bluetooth and received, in a step 21, by the mobile terminals 11 and 12, respectively carried by users U1 and U2.

It is considered in this example that the mobile terminals 11 and 12 are capable of receiving, via a first antenna 111 (or 121), and decoding such a signal S1, and in particular of recognizing whether the message carried by said signal relates to an electronic card associated with the carrier of said terminal.

For example, the mobile terminal 11 is capable of decoding the message carried by the signal S1 and of recognizing that the bank identifier contained in the information relating to the card 110 corresponds to the bank identifier of user U1. The mobile terminal 11 can thus validate the message.

Similarly, the mobile terminal 12 is capable of decoding the message carried by the signal S1 and of recognizing that the bank identifier contained in the information relating to the card 110 does not correspond to the bank identifier of the user U2.

In this way, the message carried by the signal S1 is not processed by a mobile terminal not having validated it.

In the example of FIG. 1a, the mobile terminal 11, having validated the message, transmits it to the banking organization concerned 13, in a step 22, via a second signal S2 emitted by a second antenna 112. This second signal can be an SMS or a telephone call, or an email message.

The banking organization, via a bank server 13, receives this signal S2, extracts the message from it and associates it, in a step 23, with one or more datum or data relating to the transaction T, received in a classic manner (the transaction device classically transmits, to the banking organization, data relating to each transaction performed and including in particular the date, the amount of the transaction, one or more bank identifiers of the carrier of the electronic card involved in the transaction, and so on).

In a step 24, the bank server marks the transaction T as a pre-checked transaction, so as to subsequently perform a different processing of said transaction, in particular when the corresponding bank statement is produced.

3. Description of a Second Embodiment

Figure 1B:
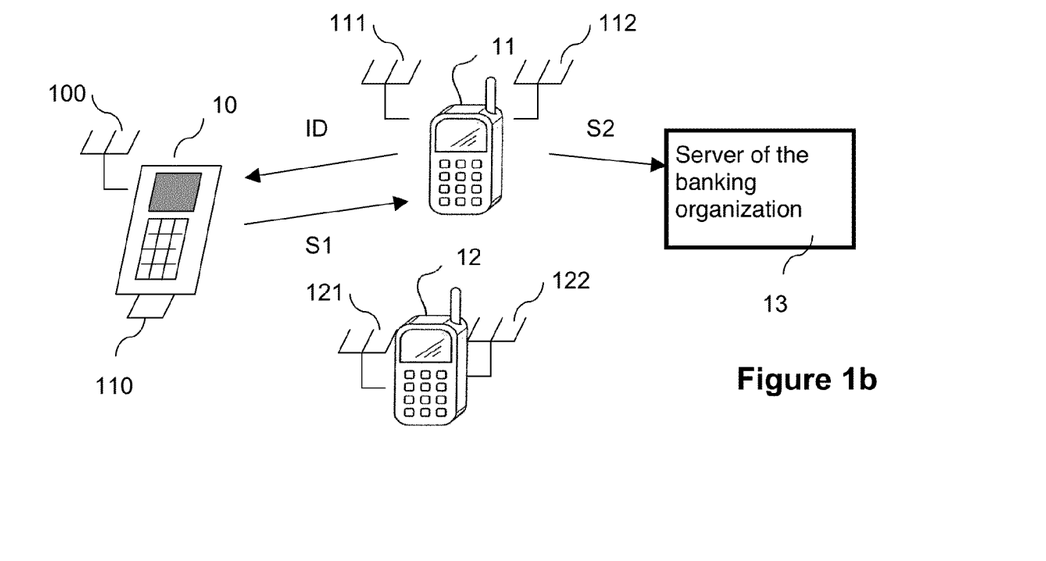

In reference to FIG. 2b, the main steps of the checking assistance method will now be described according to the second embodiment, implemented in a system as shown in FIG. 1b.

Prior to step 20 described above, the mobile terminal 11 transmits, in a step 200, to the transaction device 10, one or more identification information items ID. This information ID then enables the transaction device 10 to identify said mobile terminal 11 as being the recipient of the first signal S1 relating to the transaction T.

Thus, the mobile terminal can transmit information corresponding to the call number, and identification information of the electronic card 110 associated with the user U1.

In this way, in step 20, the transaction device emits, via an antenna 100, the signal S1 only to the mobile terminal 11, even if the mobile terminal 12 is located nearby.

The next steps of the method are identical to those described above in reference to FIGS. 1a and 2a.

This embodiment enables a specific processing of the message received by the mobile terminal, as in the example described above, to be avoided. Indeed, as the mobile terminal has been identified to the transaction device, the message that it receives is intended for it, and it can retransmit it directly, via a second signal, to the banking organization in charge of the management of the transaction.

4. Description of a Third Embodiment

Figure 1C:
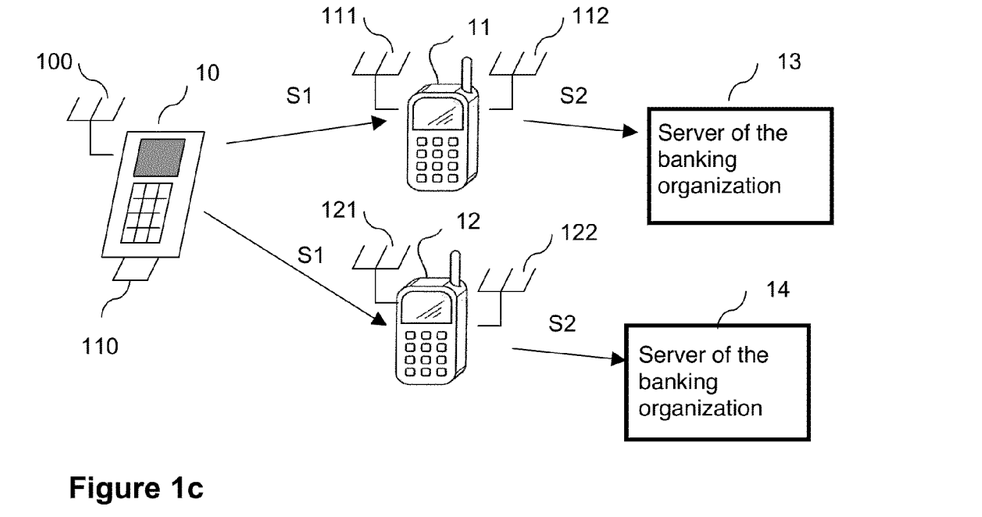

In reference to FIG. 3a, the main steps of the checking assistance method will now be described according to a third embodiment, implemented in a system as shown in FIG. 1c.

Figure 2A:
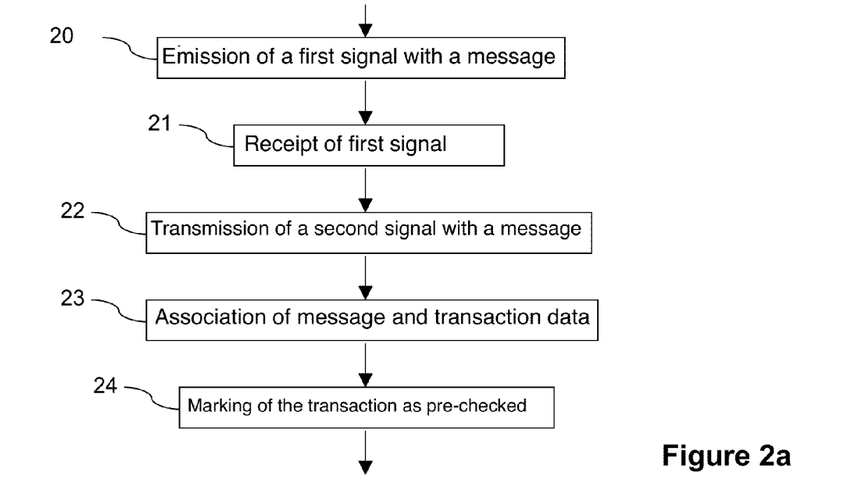
FIGS. 2a, 2b and 2c show the main steps of the method according to an exemplary aspect of the disclosure, implemented in systems as shown in FIG. 1a, 1b or 1c.
Figure 2B:
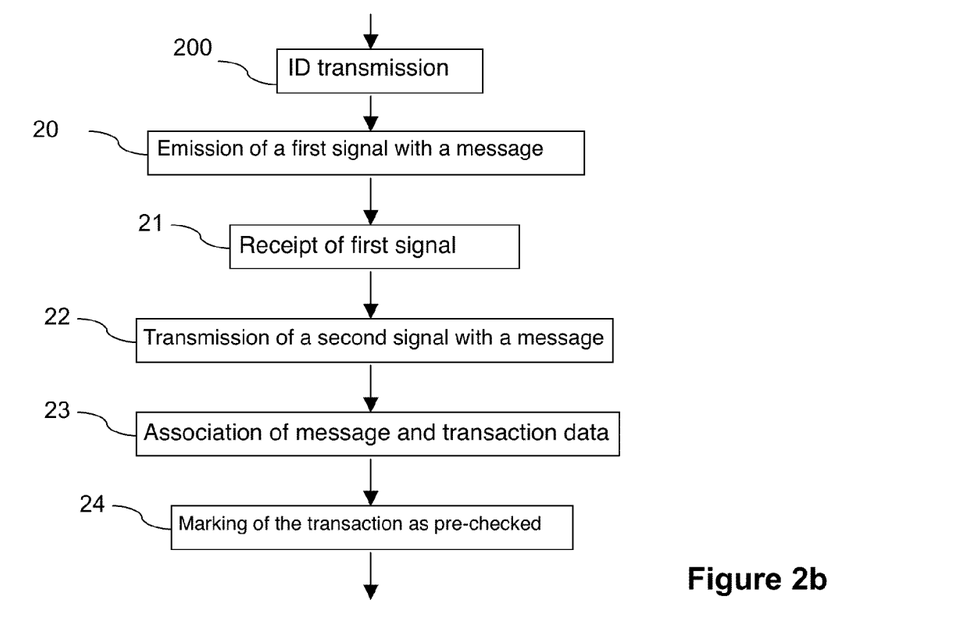
Figure 2C:
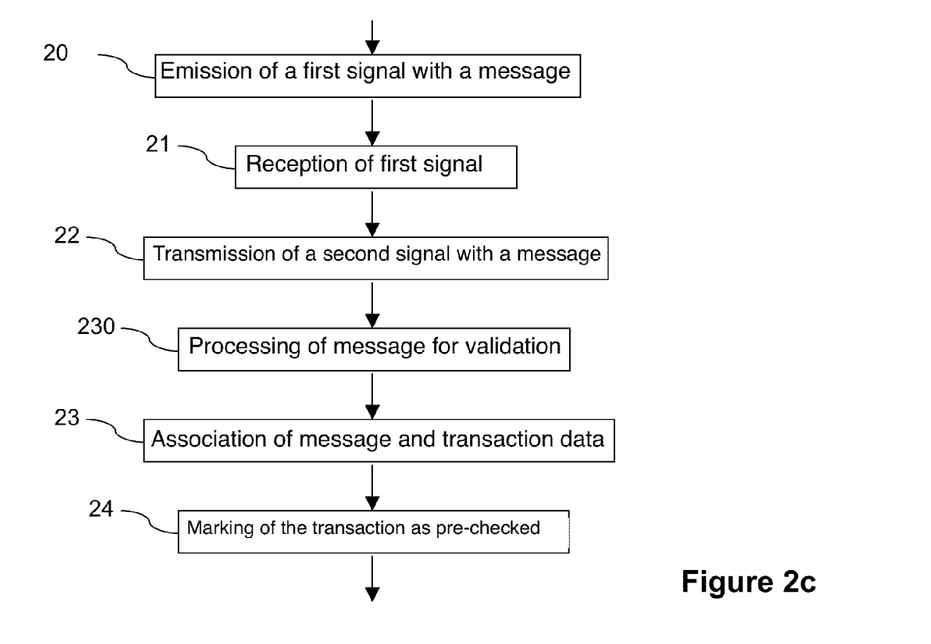

In this example embodiment, the steps 20 and 21 are identical to those of the first embodiment, described in reference to FIG. 2a.

Thus, terminals 11 and 12 receive, via a first antenna 111 (or 121), the signal S1 transmitted by the transaction device 10.

In this example, the terminals 11 and 12 transfer, in a step 22, the message carried by this signal S1 to the servers of the banking organizations concerned, respectively 13 and 14, via a second signal S2, emitted by each of the mobile terminals 11 and 12, via a second antenna 112 (or 122).

Unlike in the first embodiment, the terminals 11 and 12 do not first validate the message carried by the signal S1, and directly transfer this message to the banking organizations even if this message does not concern them. For example, the transaction T involves the electronic card 110 of user U1, and does not therefore in principle concern the banking organization 14 managing the account of user U2.

In a step 230, the message carried by the signal S2 and received by the banking organizations 13 and 14, is processed by each of these organizations, so as to determined whether or not this message concerns them.

Thus, the information transmitted in this message, and relating to the transaction T and to the electronic card 110, is compared by each of the banking organizations 13 and 14 with information concerning the bank accounts that they manage, in order to validate the message or not.

In the example of FIG. 3a, the banking organization 13 recognizes, in the account identification information of the message, information corresponding to an account that it manages, in this case that of user U1. It therefore implements the next steps 23 and 24 of the method, as described above in reference to FIG. 2a.

The banking organization 14 does not recognize the account identification information contained in the message and does not process it.

5. Description of an Example Embodiment

Figure 3:
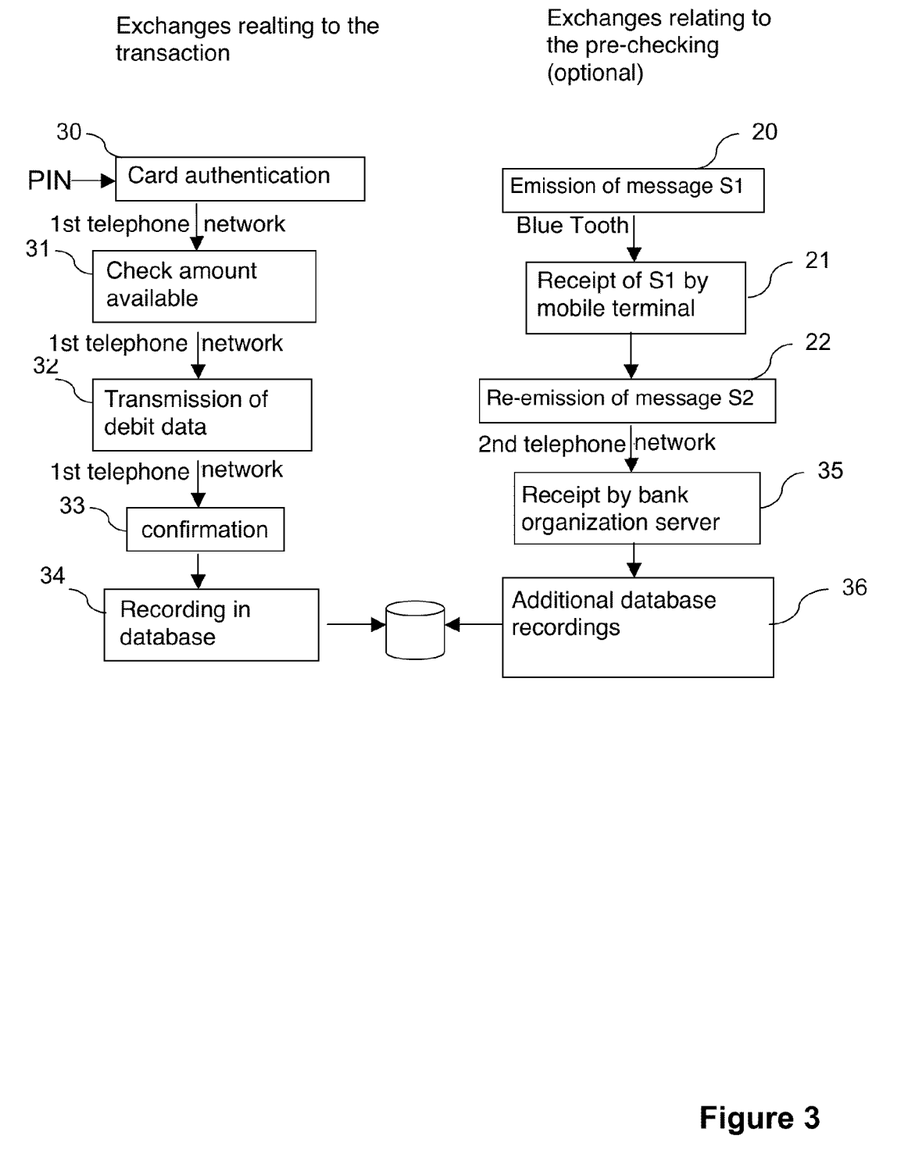
FIG. 3 shows the different exchanges relating to the transaction and to the pre-checking according to an exemplary aspect of the disclosure.

In reference to FIG. 3, the main exchanges relating to a transaction as well as the main exchanges relating to the pre-checking of this transaction will now be described according to a specific embodiment.

The exchanges relating to the transaction are classically as follows:
- a step 30 of authenticating the card 110 involved in the transaction, by means of a personal identification code PIN provided by the card carrier. The information concerning the card and the identification code are transmitted via a first telephone network to the server of the banking organization 13;
- a step 31 of verification, by the banking organization 13, of the conditions under which the transaction is performed, namely, for example, the amount available in the account of the client identified beforehand. The result of the verification is transmitted to the transaction device 10, via the first telephone network;
- a step 32 of transmitting the debit data, by the transaction device 10 to the server of the banking organization 13, again via the first telephone network;
- a step 33 of confirming the transaction;
- a step 34 of recording the data relating to the transmission, in a database of the bank server 13.

An aspect of the disclosure involves, according to various exemplary embodiments, enriching the classic data relating to the transaction, recorded in step 34, by implementing additional and optional exchanges.

These exchanges are as follows, according to a specific embodiment:
- a step 20 of emitting a first message S1, for example via Bluetooth, by the transaction terminal 10, to a mobile terminal 11;
- a step 21 of receiving the message S1 by a mobile terminal 11, via a first antenna 111;
- a step 22 of emitting, by the mobile terminal 11, a message S2 (or retransmitting the message S1 received), via an antenna 112 and a second telephone network;
- a step 35 of receiving, by the banking organization 13, the message S2;
- a step 36 of generating and recording in a database, by the server of the banking organization 13, complementary information, or complements, relating to the pre-checking of the transaction.

At least one exemplary embodiment of the disclosure provides a technique enabling a client who wants to verify the accuracy of the data on a bank statement to check it more easily.

In particular, an exemplary embodiment of the disclosure provides such a technique that does not require any additional operation or action by the user, in particular during the transaction.

An exemplary embodiment of the disclosure provides such a technique that is not restrictive or imperative for validation of a transaction.

Although the present disclosure has been described with reference to one or more examples, workers skilled in the art will recognize that changes may be made in form and detail without departing from the scope of the disclosure and/or the appended claims.

What is claimed is:

1. A method for assisting in checking accuracy of bank transaction records edited in a bank statement, wherein the method includes:
   performing at least a bank transaction by at least one electronic payment terminal or automatic cash dispenser and at least one banking organization, said banking transaction including a debit from a user's bank account;
   creating a receipt by said at least one electronic payment terminal or automatic cash dispenser comprising information relating to the debit from the user's bank account with said bank transaction, which was previously performed;
   emission, by said electronic payment terminal or automatic cash dispenser, of at least one first signal including said receipt, said first signal being transmitted according to at least one communication technique of the group consisting of:
   "Bluetooth" technology;
   "Wi-Fi" technology;
   "RFID" technology;
   "NFC" ("Near Field Communication") technology; and infrared technology;
   receiving, by at least one mobile terminal, including a mobile terminal of the user, of said at least one first signal;
   validating, by the mobile terminal of the user, said receipt relating to said previously performed bank transaction;
   upon validating said receipt, transmission, by said mobile terminal of the user, of a second signal including at least said receipt that has been validated by the mobile terminal of the user having received the receipt, the transmission being made to said at least one banking organization; and
   association, by a server of said at least one banking organization that received said second signal, of said receipt with at least one datum relating to said bank transaction, which was previously performed, and marking of said bank transaction as a pre-checked transaction, before said bank statement including said bank transaction is released by said banking organization to said user.

2. The method according to claim 1, wherein the method includes a step of generating the bank statement by said server of said banking organization, and implementing a different processing for the pre-checked transaction and for unmarked bank transactions.

3. The method according to claim 1, wherein said receipt relating to said previously performed bank transaction includes coded information relating to said previously performed bank transaction and/or to an electronic card used for said previously performed bank transaction.

4. The method according to claim 1, wherein said first signal is emitted to all of the at least one mobile terminals, including the mobile terminal of the user, that are in a vicinity of said electronic payment terminal or automatic cash dispenser.

5. The method according to claim 4, wherein said step of transmitting a second signal, to at least one banking organization, is implemented by each of said mobile terminals having received said first signal.

6. The method according to claim 4, wherein the method includes, for each of the mobile terminals having received said first signal, a step of validation of said receipt relating to said previously performed bank transaction,
and wherein said step of transmitting a second signal, to at least one banking organization, is implemented only by the mobile terminal of the user having validated said receipt.

7. The method according to claim 1, wherein the method includes a preliminary step of emission, by the mobile terminal of the user, which is associated with an electronic card used for said previously performed bank transaction, of at least one identification information, to said electronic payment terminal or automatic cash dispenser, and said first signal is emitted only to said mobile terminal of the user.

* * * * *